A. E. DEMPSEY.
AUTOTRUCK TIRE.
APPLICATION FILED APR. 8, 1918.
1,319,570.  Patented Oct. 21, 1919.
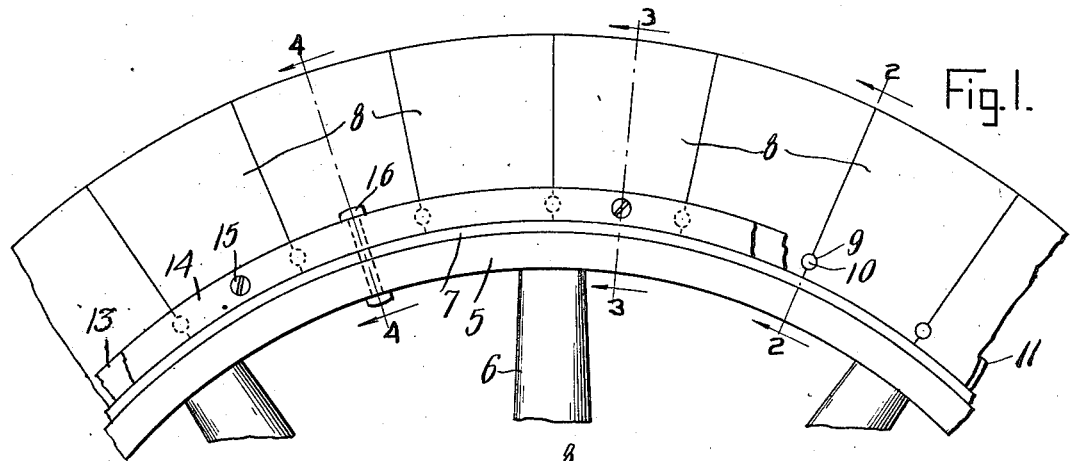
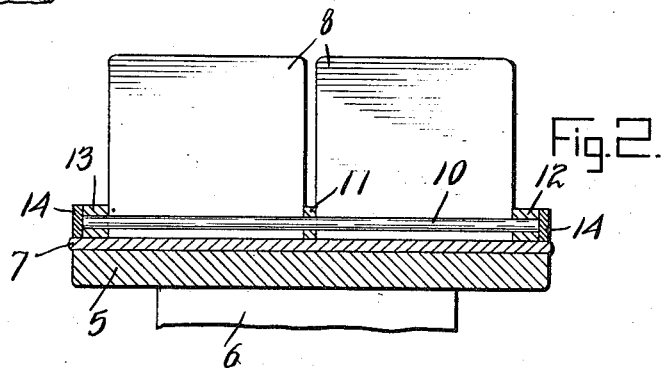
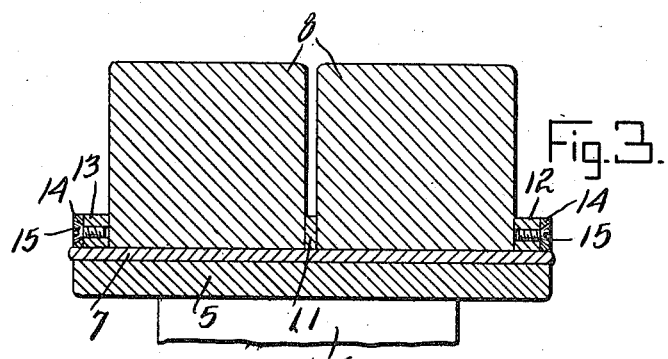
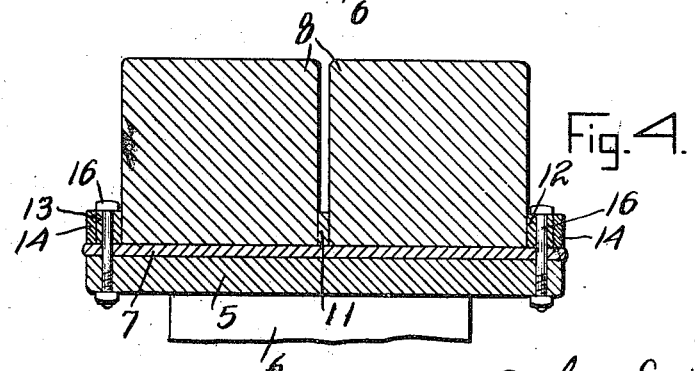
Inventor
Arthur E. Dempsey
By H. H. Byrne
Attorney

UNITED STATES PATENT OFFICE.

ARTHUR E. DEMPSEY, OF NEW YORK, N. Y., ASSIGNOR TO CALLAN BROS. INC., OF NEW YORK, N. Y., A CORPORATION OF NEW YORK.

AUTOTRUCK-TIRE.

1,319,570.          Specification of Letters Patent.          Patented Oct. 21, 1919.

Application filed April 8, 1918. Serial No. 227,323.

*To all whom it may concern:*

Be it known that I, ARTHUR E. DEMPSEY, a citizen of the United States of America, residing at New York city, in the county of Bronx and State of New York, have invented certain new and useful Improvements in Autotruck-Tires, of which the following is a specification.

The present invention relates to improvements in tires for auto-truck wheels and consists in the combinations and arrangements of elements herein after described and particularly set forth in the accompanying claim.

The invention has for its purpose to provide a tire for heavy vehicles which is of light and durable construction and adapted to be repaired at the places where worn and thereby not require the replacement of an entire or new tire when the replaced tire has been worn in part only.

A further purpose of the invention consists in providing a tire made up of a plurality of closely assembled wooden blocks that are interlocked in a manner to prevent radial displacement, and which are secured to the wheel rim by a means which will allow the entire tire or any part thereof to be removed.

The invention is shown by way of illustration in the accompanying drawings wherein—

Figure 1 is a fragmentary elevational view of a wheel equipped with the tire;

Fig. 2 a transverse sectional view thereof taken on the line 2—2;

Fig. 3 a similar view on the line 3—3; and

Fig. 4 a like view on the line 4—4.

Referring to the construction in further detail and wherein like reference characters designate corresponding parts in the different figures shown, 5 designates the wheel rim or felly mounted on the usual spokes 6 or in any other approved manner and 7 indicates a metal band or rim shrunk or otherwise secured to the wheel rim 5.

The tire consists of a plurality of wooden blocks 8 arranged in a double row and assembled in close contacting relation around the wheel rim and the contacting faces of said blocks have grooves or channel-ways 9 formed therein and disposed transversely of the tire, after the manner shown in Figs. 1 and 2.

The means for securing the double row of blocks to the wheel rim consists of key rods 10 that are separately fitted into the grooves 9 and entirely through both rows of blocks and the respective end portions of said key rods project an appreciable distance beyond the outer sides of the blocks as shown. A spacing ring 11 is interposed between the two rows of blocks entirely around the wheel, and a pair of thicker rings 12 and 13 is disposed against the outer side faces of the blocks and likewise extend continuously around the wheel. The several key rods 10 pass through the three rings 11, 12 and 13 that are suitably apertured for this purpose and by this means the several blocks are held against relative displacement in a radial direction.

An annular strip or ring 14 of suitable metal is disposed against the outer side surface of each of the side rings 12 and 13 and is secured to said ring 12 or 13 by the screws 15 that are applied in the manner shown in Fig. 3. In a similar manner the pair of rings 12 and 13 is secured to the wheel rim by the bolts 16 that pass through said rings 12 and 13, the rim 7 and the rim 5 (see Fig. 4). It will be seen from the foregoing that a light and durable rim is provided that will serve all purposes of the usual heavy hauling for which present day auto-trucks are employed, and it will be noted that the tire in its entirety may be readily dismounted, or that any small part thereof may be as easily removed and replaced by a new part.

It is obvious that those skilled in the art may vary the details of construction and arrangement of parts without departing from the spirit of my invention, and therefore I do not wish to be limited to such features except as may be required by the claim.

Having thus described the invention what is claimed as new is:

A tire for wheels comprising a plurality of segmental blocks arranged in a double row and assembled in close contacting relation around the wheel rim, the contacting faces of said blocks having channels formed therein providing key-ways transversely of the tire, key-rods fitting in said key-ways and holding the blocks against relative radial displacement, rings mounted on the wheel rim between and on the outer sides of said blocks and receiving the key-rods, and bolts securing said outer key-rod-receiving rings to the wheel rim, substantially as set forth.

In testimony whereof I affix my signature in the presence of two witnesses.

ARTHUR E. DEMPSEY.

Witnesses:
 THOMAS J. CALLAN,
 ROBERT SHEA.